(12) United States Patent
Tewell

(10) Patent No.: US 9,552,610 B1
(45) Date of Patent: Jan. 24, 2017

(54) ONLINE COLLECTION PORTAL SYSTEM AND METHOD

(75) Inventor: Larry Tewell, Draper, UT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 166 days.

(21) Appl. No.: 12/509,300

(22) Filed: Jul. 24, 2009

(51) Int. Cl.
*G06Q 40/00* (2012.01)
*G06Q 40/06* (2012.01)

(52) U.S. Cl.
CPC .................................. *G06Q 40/06* (2013.01)

(58) Field of Classification Search
USPC .......................................................... 705/35
See application file for complete search history.

(56) References Cited

U.S. PATENT DOCUMENTS

| | | | |
|---|---|---|---|
| 6,567,850 B1 | 5/2003 | Freishtat et al. | |
| 6,871,220 B1 | 3/2005 | Rajan et al. | |
| 7,383,215 B1 * | 6/2008 | Navarro et al. | 705/36 R |
| 7,606,752 B2 | 10/2009 | Hazlehurst et al. | |
| 8,949,840 B1 | 2/2015 | Pulford et al. | |
| 2003/0074290 A1 * | 4/2003 | Clore | 705/35 |
| 2005/0211765 A1 | 9/2005 | Brown et al. | |
| 2005/0273442 A1 * | 12/2005 | Bennett et al. | 705/67 |
| 2006/0010066 A1 * | 1/2006 | Rosenthal et al. | 705/37 |
| 2008/0065520 A1 | 3/2008 | Hazlehurst et al. | |
| 2008/0301042 A1 | 12/2008 | Patzer | |
| 2008/0306846 A1 | 12/2008 | Ferguson | |
| 2009/0076972 A1 * | 3/2009 | Witchel et al. | 705/80 |
| 2009/0164365 A1 * | 6/2009 | Dragt et al. | 705/38 |

OTHER PUBLICATIONS

Office Action on U.S. Appl. No. 14/481,643, dated Nov. 2, 2015, 19 pages.

* cited by examiner

*Primary Examiner* — Hani M Kazimi
*Assistant Examiner* — Hatem M Ali
(74) *Attorney, Agent, or Firm* — Foley & Lardner LLP

(57) ABSTRACT

A computer-implemented method for initiating online collections that includes determining a current status of an account held by an account holder, determining a real-time financial profile of the account holder using information on the banking institution computer systems and third party information providers and displaying a customized status message based on the account holder's financial profile. The method provides remediation options to the account holder.

28 Claims, 12 Drawing Sheets

ONLINE COLLECTION PORTAL SYSTEM AND METHOD

BACKGROUND OF THE INVENTION

On-line banking tools offer customers of financial institutions a convenient way to manage their accounts without having to visit brick and mortar locations. Consumer and commercial on-line banking tools are available and permit account holders to perform account management operations such as funds transfers, bill payment, cash and treasury management, investment, procurement, international, trust, and credit and loan services, and so on.

Currently, banking institutions continue to need to reach their account holders regarding when their accounts have an adverse account status and for performing remediation (e.g., collections) activities. While existing on-line banking tools have proved useful, an ongoing need exists for further improvements.

SUMMARY OF THE INVENTION

Example embodiments of the present invention relate to a computer-implemented method for initiating account status remediation that includes receiving login information from an account holder, responding to the login information by accessing a database, and retrieving information from the database regarding an account held by the account holder. The method further includes generating a display for the account holder via a user computing device. The display shows a status message generated based on the information retrieved from the database. The message informs the account holder of an adverse account status of the account that needs to be remediated.

Example embodiments of the present invention relate to a computer-implemented method for initiating account status remediation by receiving bank account log in information from an account holder, determining a current status of the account held by the account holder, and displaying a message to the account holder. The message informs the account holder of an adverse account status and provides remedial options.

Example embodiments of the present invention relate to a computer-implemented method for initiating online collections by determining a real-time risk assessment for an account of an account holder using information in the banking institution computer systems and third party information providers. The method further comprises displaying a status message customized based on the risk assessment. The method allows the banking institution to vary the urgency of the displayed message.

BRIEF DESCRIPTION OF THE DRAWINGS

FIG. 6 is a screen display showing account details for one of the accounts of FIG. 5.

FIG. 9 is a screen display showing a first payment program that may be offered to an account holder.

FIG. 11 is a screen display that may be provided to an account holder to show terms and relate messages in connection with an accepted payment program.

FIG. 12 is screen display that may be provided to an account holder in connection with a second payment program that may be offered to the account holder.

DETAILED DESCRIPTION OF EXAMPLE EMBODIMENTS

Figure 1:
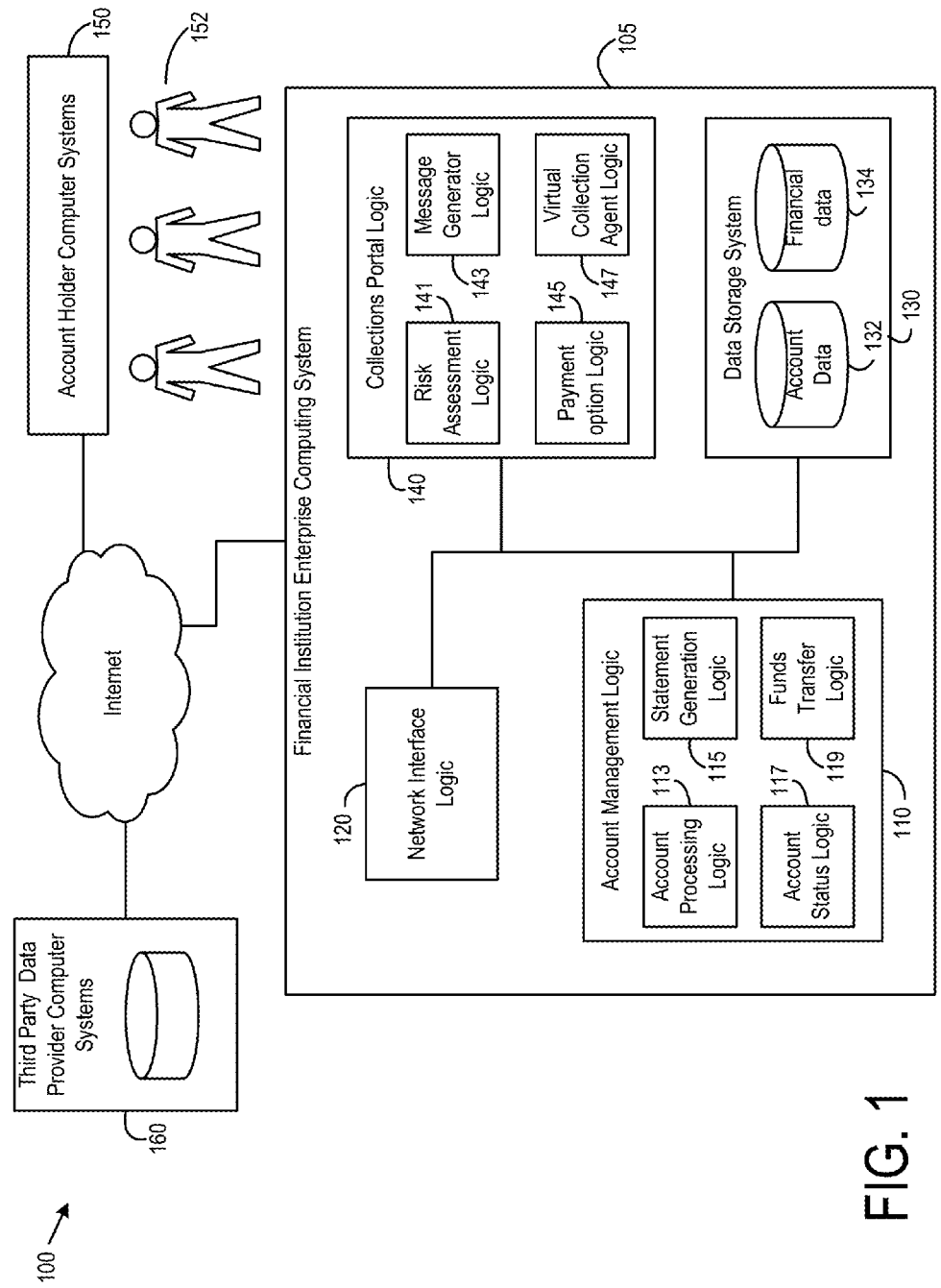
FIG. 1 is a schematic diagram of a data processing system according to an embodiment of the present invention.

Referring to FIG. 1, a data processing system 100 according to an example embodiment is shown. The data processing system 100 includes an enterprise computing system 105 that may include, among other systems, account management logic 110, network interface logic 120, data storage system 130, and collections portal logic 140. The data processing system 100 may further include account holder computer systems 150 and third party data provider computer systems 160.

In an example embodiment, the enterprise computing system 105 may be provided by a financial institution, such as a bank, and the account holder 152 may be a customer of the financial institution that accesses the system 105 through tellers at retail bank branches, through the Internet, or in another manner. The customers may, for example, access system 105 through an on-line banking area of a website of the bank. As another example, computing system 105 may be associated with other types of companies that maintain customer accounts, such as credit card issuers, mortgage companies, utility companies, insurance companies, and so on. As another example, part or all of computing system 105 may be associated with vendors to whom billing, collection, or call center operations are outsourced by other companies.

In the example where system 105 is provided by a financial institution, such as a bank, account management logic 110 may further include account processing logic 113, statement generation logic 115, account status logic 117, and funds transfer logic 119. Such logic may be implemented in a machine (e.g., one or more networked computer servers) comprising machine-readable media having instructions stored therein which are executed by the machine to perform the operations described herein.

The account processing logic 113 may perform account processing to process transactions in connection with the account(s) of an account holder 152, such as account debits and credits to checking and savings accounts, credits and debits to home mortgage and home equity accounts, credits and debits to student loan accounts, and so on. For example, in the context of checking accounts, the transactions may also include electronic bill payment transactions in which monies from the checking account of the user are used to pay bills received by the user. The account processing logic 113 may retrieve and store information in the data storage system 130 relating to the account data 132. Statement generation logic 115 may generate statements for relating to account held by the account holder 152. Account status logic 117 may generate codes that indicate that an account has an adverse account status. An account may have an adverse account status for a variety of reasons. Examples of an adverse account status include a payment delinquency on a credit card or other loan, an overdrawn checking account, being over the credit limit on a credit card, excessive transactions on one account, suspicious or fraudulent transactions on an account, and so on. In the example described below, the adverse account status is assumed to be a payment delinquency on a loan.

The funds transfer logic 119 may be used to transfer funds between accounts of a single account holder 152 or between an account of an account holder 152 and a third party (which may or may not be another account holder). The funds transfer logic 119 may receive a fund transfer request from an account holder through a teller, through the on-line banking area of the website, or through other systems in the banking institution computer system 105, such as the collections portal logic 140, or other outside collections system. In response to a fund transfer request, the fund transfer logic 119 may transfer funds from an account that is not in default to an account that may be in default. The fund transfer logic 119 may perform the transfer of funds by updating the account data 132.

Network interface logic 120 may be used to connect the computing system 105 to the Internet to permit customers to use computers 150 to access computing system 105 through an on-line banking area of a website of the bank. For example, in the context of desktop/laptop computers, network interface logic 120 may comprise one or more web servers that provide a graphical user interface (e.g., a series of dynamically-generated web pages) for users that access system 105 through the web. The graphical user interface may be used to prompt the user to provide login information, passwords and other authentication information (i.e. tokens, pins, answers to personal questions, or the like), to provide the user with account information, and so on. Network interface logic 120 may also comprise other logic that is configured to provide an interface for other types of devices such as handheld mobile computing devices 150 (e.g., portable e-mail devices, cell phones, smart phones, and so on), ATMs, and server-based computing systems, and so on.

The data storage system 130 stores account data 132 and other financial data 134. The account data comprises account balance information for accounts held by the customers with the financial institution. The financial data 134 may comprise other financial information regarding the customers (e.g., in the form of a self cure table for each customer) that may be gathered from internal and external sources. For example, financial data 134 may include a variety of information regarding any given customer such as, for example, balance trends, net worth, equity ratios, late payments, past collections histories or the like. The utilization of data 132 and 134 is described in greater detail below.

The collections portal logic 140 may be used to resolve the adverse account status associated with an account holder 152, in the illustrated example, assumed to be a delinquent payment(s) on a loan. The collections portal logic 140 includes risk assessment logic 141, message generator logic 143, payment option logic 145, and virtual collection agent logic 147. As indicated previously, part or all of computing system 105 may be associated with vendors to whom billing, collection, or call center operations are outsourced by other companies. Hence, for example, virtual collection agent logic 147 may be associated with a collection agent vendor rather than being part of the enterprise computing system 105 of the financial institution.

The risk assessment logic 141 may be used to generate a risk assessment (e.g., a risk score) in connection with an adverse account status. The risk assessment may, for example, be in the form of a risk score or other quantification indicating the probability of an adverse event occurring (such as delinquency or default on the account debt). For example, if the customer has missed a credit card payment, but account data for the customer indicates that the account balances of the customer have been relatively stable and the customer has cash available that is well in excess of what is needed to completely pay off the credit card, then the risk assessment logic may generate a risk score indicating that a relatively lower degree of risk. Conversely, if the account data for the customer indicates that the account balances of the customer have dropped significantly in recent months, and the customer has cash available that is significantly less than the outstanding credit card balance, then the risk assessment logic may generate a risk score indicating that a relatively higher degree of risk.

The risk assessment may be generated based on data 132 and 134. The account data 132 (e.g., the amount of the delinquency, the existence of other delinquencies, the account balances on other accounts held by the account owner, and so on) is updated at least on a daily basis and provides a real time indication of the financial status of the customer. The financial data 134 may comprise other financial information regarding the customers (e.g., in the form of a self cure table for each customer). The financial data 134 may be updated in real time (e.g., in the case of data that is generated based on account data) or may be updated on at least a daily, weekly, monthly, or quarterly basis, depending on the data that is being updated.

The financial data 134 may include data from internal and external sources. The data from internal sources may include analytic data that is generated based on the account data 132 (e.g., account balance trends, net worth, equity ratios, late payments, past collections histories, number of days of delinquency, and so on), which may also be updated on a daily basis. The data from external sources 160 may include data from credit agencies, Dunn & Bradstreet, Hoovers, government agencies, and other institutions. For example, such data may include the credit score of the customer as provided by a credit reporting agency. The credit score may be retrieved in real time upon login or it may be retrieved and stored in advance (e.g., updated on a weekly or monthly basis). Such data from external sources 160 may also include economic data that is not personal to the customer but rather reflects broader economic trends that impact the customer more directly than the general population as a whole. For example, if the customer is known to have a particular profession, then the data may include data indicating the economic prospects for that profession. Likewise, if the customer is known to live in a particular geographic region (e.g., a particular MSA), then the data may include data indicating the economic prospects for that region. Such data may be updated regularly, for example, as new government reports are published containing such information. As another example, if the customer is known to be employed by a particular company, then the data may include information indicative of the economic prospects of that company (e.g., current stock prices of the company, stock price trends for the company, D&B ratings, and so on).

The message generator logic 143 may be configured to determine the form and content of an alert status message based on the risk assessment provided by the risk assessment logic 141 and other information. The message generator logic 143 may be programmed to present various predetermined messages with varying urgency for a delinquent account holder during an online customer collections process. For example, if the risk assessment logic 143 determines that there is a relatively high degree of risk associated with a particular delinquency, the status message may be provided in the form of a splash page which breaks the flow of the normal login process of the customer into an on-line banking area of the bank's website. Conversely, if the risk assessment logic 143 determines that there is a relatively low degree of risk associated with a particular delinquency, the customer may be allowed to proceed directly to the on-line banking area of the bank's website, and the status message may be provided in the form of a message that is placed adjacent other account information for the delinquent account of the account holder. Likewise, the content (e.g., wording) of the message may also be varied depending on the level of risk to reflect varying levels of urgency for the customer to resolve the delinquency.

Additionally, the message generator logic 143 may include a business rules engine that allows other messaging rules to be programmed and taken into account. Such rules may operate on data 132 and/or 134 (including data that is updated in real time) or may operate on other data. Such rules may be based on factors that are not risk-based, that is, that are not driven by the risk that the customer will be unable to repay the delinquent account but rather are driven by other considerations. One example of such a factor is legal/regulatory-based factors. For example, if a customer has declared bankruptcy, then it may not be legally permissible to transmit messages to the customer regarding the collection of delinquent accounts, even though the risk assessment generated by the risk assessment logic 141 would otherwise cause an urgent message to be transmitted. Hence, business rules may be programmed to prevent the transmission of such messages to a customer that has declared bankruptcy. As another example, different states have different requirements under state law regarding disclosures that must be provided to consumers. The content of the messages may be programmed via business rules to reflect such differences in state laws. That is, different business rules may be programmed which specify the content of disclosure messages for different states, such that a consumer located in a given state is provided with the correct disclosure message for that state. Another example of non-risk based factors is business operations-based factors. For example, a customer may have multiple delinquent accounts, each of which delinquencies alone merits a message. However, after a first splash screen is presented, the marginal utility of presenting the customer with additional splash screens may be deemed for business reasons to be minimal. Accordingly, business rules may be programmed to prioritize the accounts, such that a splash screen is generated only in connection with one of the accounts. Another example of non-risk based factors is customer relations-based factors. For example, if one of two joint account holders has passed away, it may be undesirable to contact the other account holder regarding account delinquencies, at least for a period of time. As such, a business rule may be implemented that prevents messages from being sent to the other account holder for a predetermined period of time after the passing of the first account holder.

Figure 7:
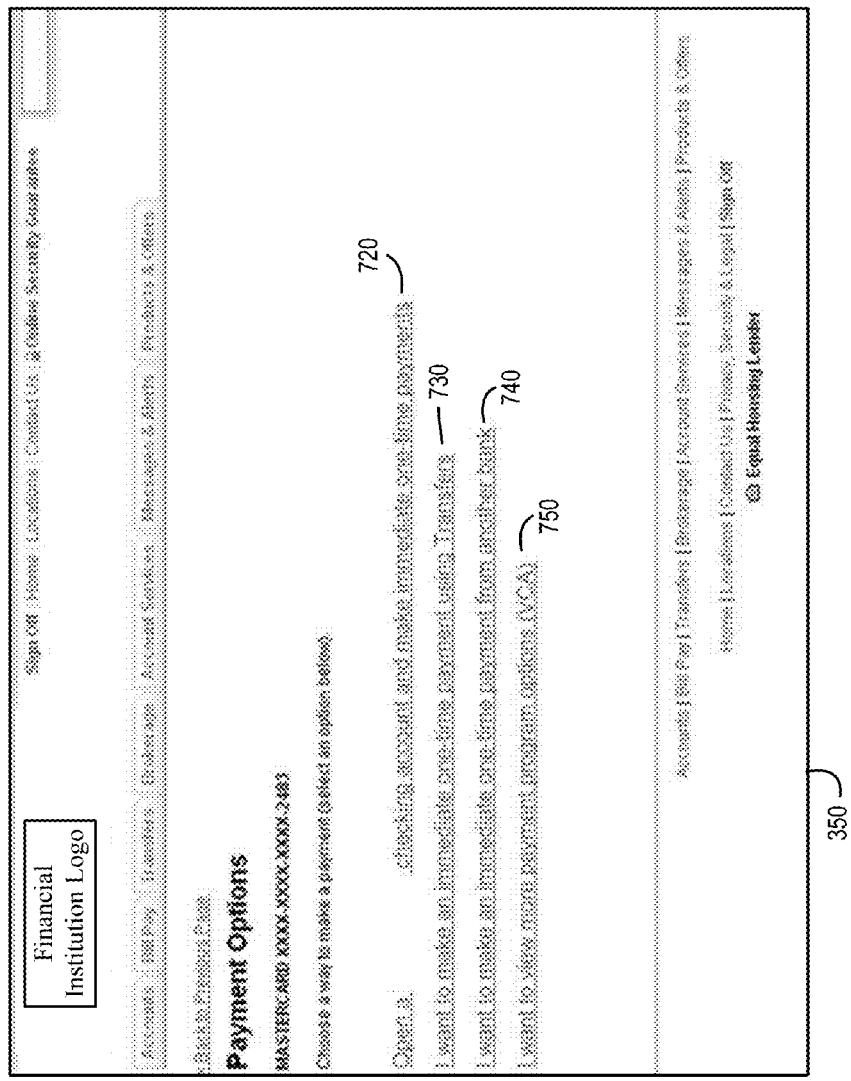
FIG. 7 is a screen display showing various payment options available to a account holder.

The payment option logic 145 generates payment options for self-cure of the delinquency by the account holder 152 (FIG. 7). The payment option logic 145 also determines whether to generate settlement options for the account holder 152 (FIGS. 8-12). This determination may be made upon login based on the account data 132 and based on the risk assessment generated by the risk assessment logic 141. For example, where the delinquency is determined to have a relatively low degree of risk, the payment option logic 145 may determine that no alternative settlement options are required. Alternatively, where the delinquency is determined to have a relatively high degree of risk, the payment option logic 145 may determine that alternative settlement options are required. Further, in this situation, the payment option logic 145 may proceed with generating such options. Hence, the customer may be provided with options to pay off a credit for less than the total amount owed. Again, the options may be generated based on the account data 132 and based on the risk assessment generated by the risk assessment logic 141. The settlement options may be displayed immediately (e.g., as part of a splash page) or in subsequent displays generated by the virtual collection agent logic 147.

The payment option logic 145 may also determine whether only a single settlement option is to be provided (e.g., in relatively lower risk situations) or whether multiple settlement options are to be provided (e.g., in relatively higher risk situations). The payment option logic 145 may also determine the order in which such options are provided, for example, based on past collections history. For example, if a delinquent account holder 152 has accepted a particular type of offer (i.e. a percentage payment, monthly payment plan, 12 month payment plan from a credit card, transfer from a particular checking account, paying the minimum or the like) in the past, then that type of offer may be one of the first offers presented to the account holder. In another embodiment the payment option logic 145 may identify for the account holder that the account holder has chosen a particular type of offer in the past. In yet another embodiment, the payment option logic 145 may access account data and store a favorite type of offer as selected by the account holder 152 during a previous last collections process.

The virtual collection agent logic 147 presents the settlement options to the account holder. The virtual collection agent logic 147 may also prompt the customer to answer a series of questions to resolve delinquent status of the account and bring the account to non-delinquent status. The virtual collection agent logic 147 may also manage payment streams from the account holder to pay off a delinquent account or to bring a delinquent account up to date. In one embodiment, the virtual collection agent logic 147 is provided by a third party (e.g., a vendor computer system that is separate enterprise computing system of the financial institution). From the perspective of the customer, however, such integration may be seamless and it may appear to the customer that the customer is still on the website of the banking institution. For example, the same URL may be used and a single sign-on process may be used (i.e., in which the customer only logs on once, namely, when first entering into an on-line banking session). In other embodiments, the virtual collection agent logic 147 may be provided as part of the enterprise computing system 105.

Figure 2:
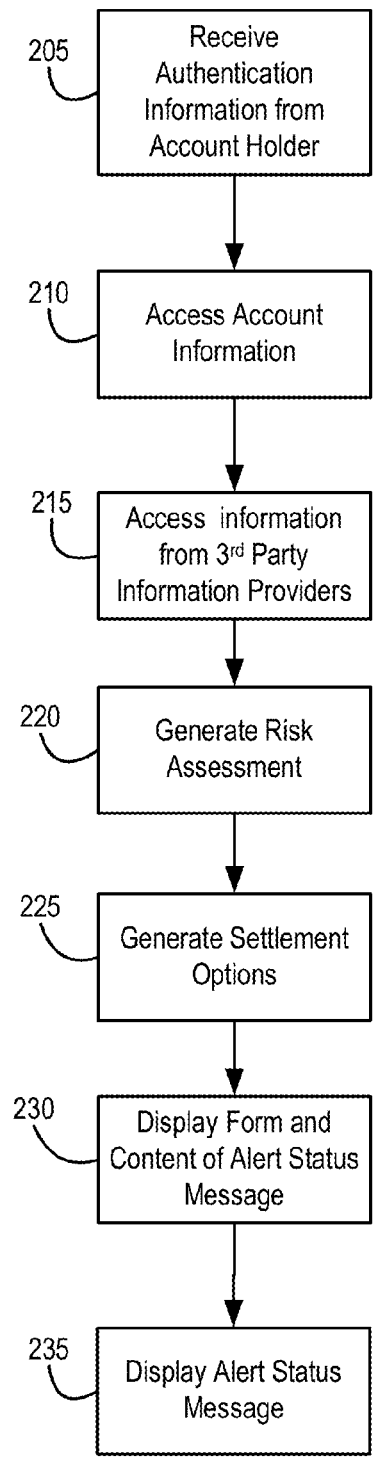
FIG. 2 is an example process that may be implemented using the system shown in FIG. 1.

Referring now to FIG. 2, FIG. 2 shows an embodiment of the present invention that may be implemented using the system shown in FIG. 1. At step 205, authentication information is received from an account holder 152. For example, the account holder 152 may be visiting the website of the financial institution and may provide login/password information to initiate an online banking session.

At step 210, the computer system 105 accesses account information for accounts held by the account holder 152 using the account status logic 117 to determine whether the account holder 152 has any delinquent accounts. The account status logic 117 may indicate that an account is delinquent, e.g., that the account holder is delinquent in making a payment on a loan. (For purposes of the present example, it is assumed that the account holder has a delinquent account. If there are no delinquent accounts, then the process shown in FIG. 2 terminates and the customer is delivered directly to on-line banking) At step 215, information from external sources is accessed. As previously indicated, such information may be obtained in advance and stored in data storage system 130 where it can be accessed during user authentication.

At step 220, the risk assessment logic 141 generates a risk assessment. Based on the risk assessment, at step 225, the payment option logic 145 determines whether settlement options should be generated and, if so, generates such options. At step 230, the form and content of the alert status message is determined and, at step 235, the alert status message is displayed. The operation of system 105 in the context of steps 230 and 235 is described in greater detail in connection with FIGS. 3-12.

Figure 3:
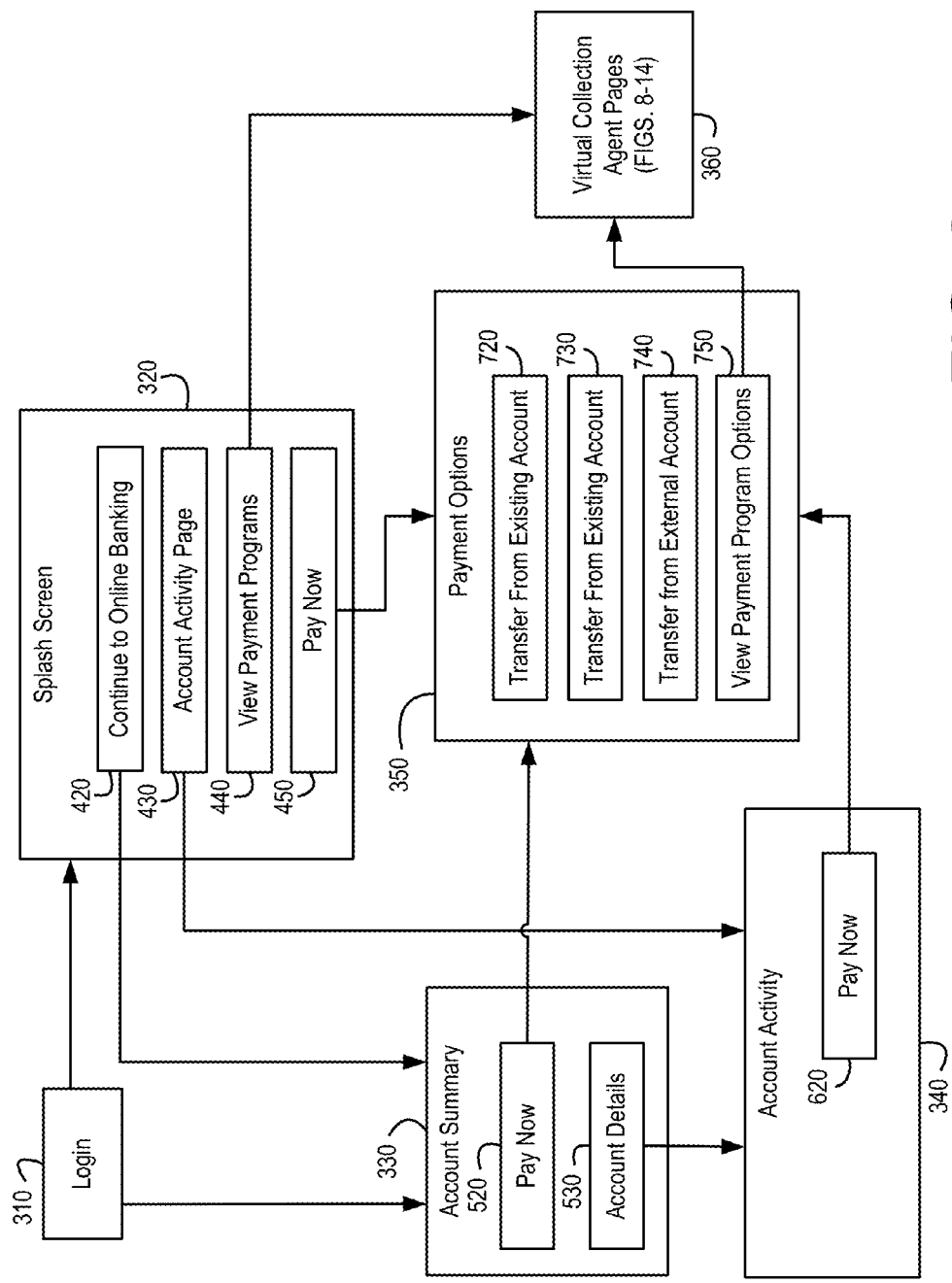
FIG. 3 is sequence of displays that may be provided to an account holder using the system shown in FIG. 1 to begin a web based collections process.

Referring first to FIG. 3, FIG. 3 displays a sequence of displays (e.g., web pages) that may be generated for presentation to an account holder 152 by a computer system 150. In particular, display 310 is a login screen used to receive login information from an account holder 152. Upon receiving the login information, the account status logic 117 determines whether any of the accounts held by the user have an adverse account status (e.g., whether the user is late in making payments on any loans or credit cards) and the message generator logic 143 determines the form and content of messaging that is to be used in connection with such accounts, as previously described above in connection with steps 205-225 of FIG. 2.

Figure 4:
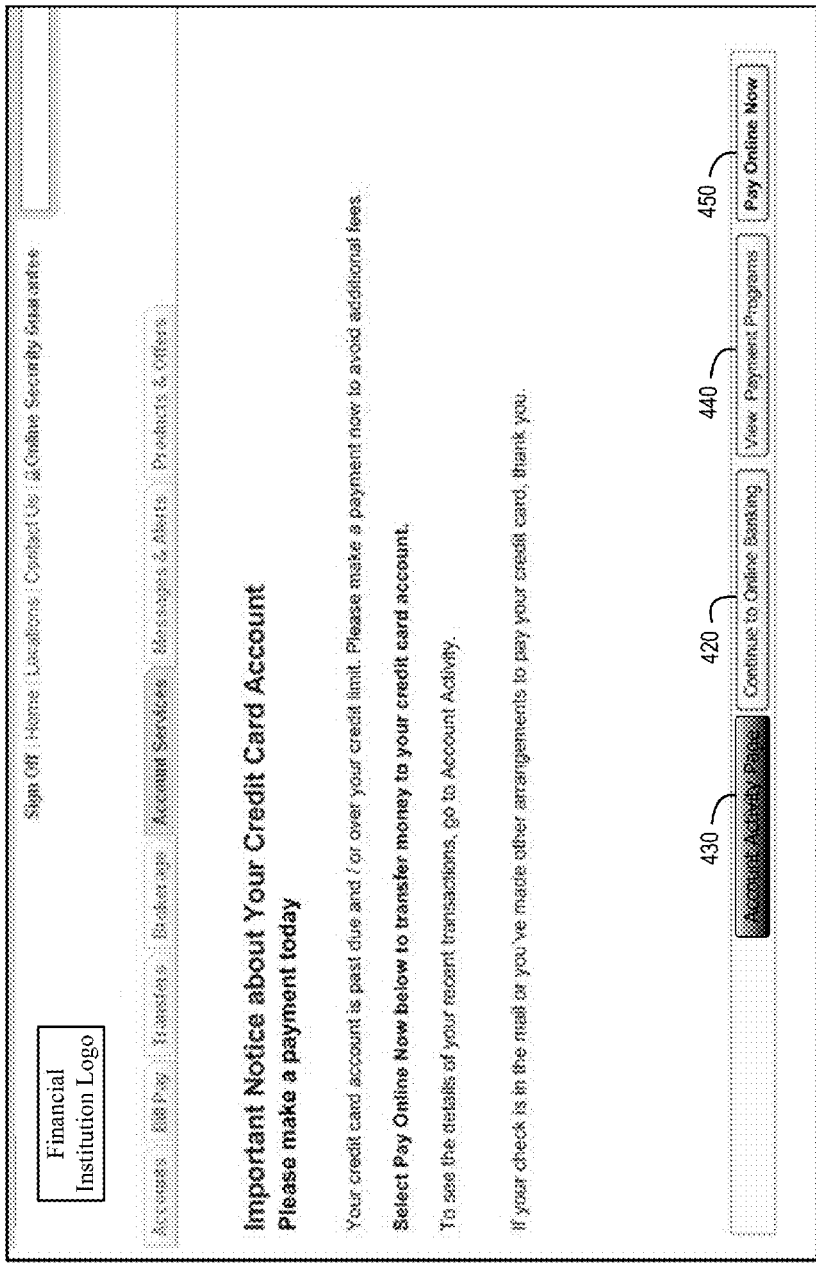
FIG. 4 is a customizable splash screen showing delinquent account status and various options that may be presented to an account holder.

The message generator logic 143 customizes the page flow based on the risk assessment (e.g., the risk score) provided by the risk assessment logic 141 and other information regarding the account holder 152. For example, if it is determined that the customer is to be presented with a splash page (at step 230 in FIG. 2), then the display sequence proceeds to splash screen 320. Splash screen 320 is shown in greater detail in FIG. 4. Referring to FIG. 4, FIG. 4 shows an example splash screen 320 that may be displayed to a delinquent account holder 152. In the context of a website, a splash screen is a page that breaks the normal flow of web pages provided to a user as would otherwise have been dictated based on the clicked-on links and other selections made by the user during the process of navigating the website. For example, for an on-line banking website, if an account summary page is typically the page that is displayed after user login, the splash screen may be a page that is displayed after login instead of the account summary page. In the illustrated example, the splash screen 320 is displayed instead of the account summary page, not in response to user inputs, but rather in response to other factors (relating to an account delinquency). In some embodiments, a splash screen may cover the entire display width and height, however, in other embodiments, the splash screen may only cover a rectangle near or around the center of the screen.

In the example shown in FIG. 4, the splash screen provides message content that states, "Your credit card account is past due and/or over your credit limit. Please make a payment now to avoid additional fees." As previously indicated, each splash screen message may be customized to the account holder 152 based on the risk assessment generated by the risk assessment logic 141 and based on the rules analysis performed by the message generator logic 143. As shown in FIG. 4, the splash screen may offer the choices including continuing to online banking (link 420), account activity page (link 430), viewing payment programs (link 440), or paying online now (link 450). Other embodiments of the splash screen may display the actual amount and the account that is currently delinquent. Yet other embodiments of the splash screen may display an option to transfer fund from a non-delinquent account to a delinquent account. In another embodiment, the splash screen may provide a settlement option and allow the account holder 152 to transfer funds from one account to the delinquent account pursuant to the settlement option.

Figure 5:
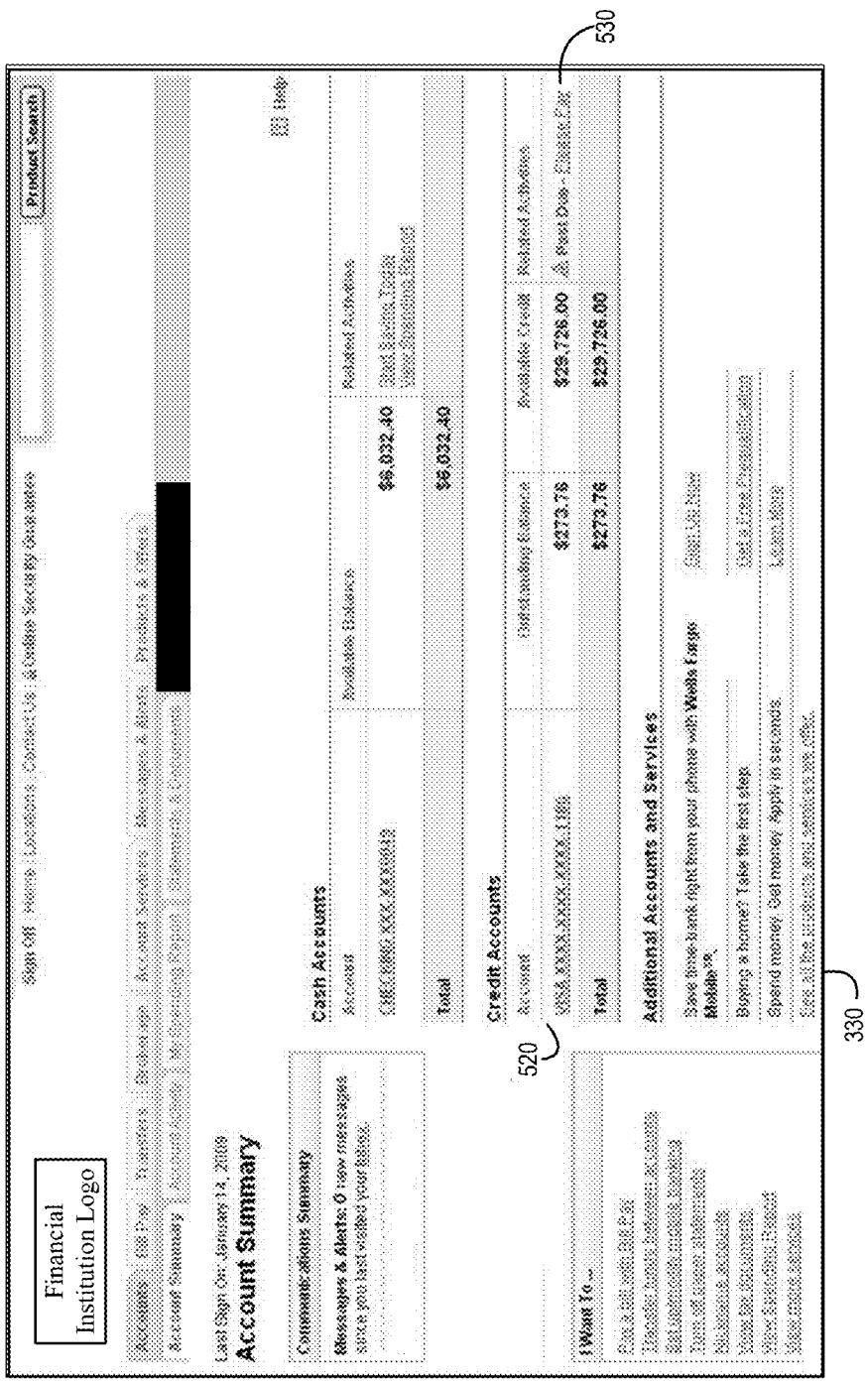
FIG. 5 is a screen display showing account summaries for various accounts held by an account holder.

Referring now also to FIG. 5, FIG. 5 shows account summary page 330. If it is determined that the customer is not to be presented with a splash page (at step 230 in FIG. 2), then the display sequence proceeds to account summary page 330. Alternatively, the display sequence may proceed to account summary page 330 if the account holder 152 selects link 420 in FIG. 4.

The account summary page 330 allows the account holder 152 to access the account activity. In FIG. 5, for an example account holder 152 who is past due on a VISA® credit account 520, a message 530 is displayed which states: "past due—please pay." If the account holder clicks on the account number (which is a link), then the account holder is delivered to page 340, shown in FIG. 6. If the account holder 152 chooses to click on the message (which is also a link), then the account holder is delivered to page 350, shown in FIG. 7.

Figure 6:
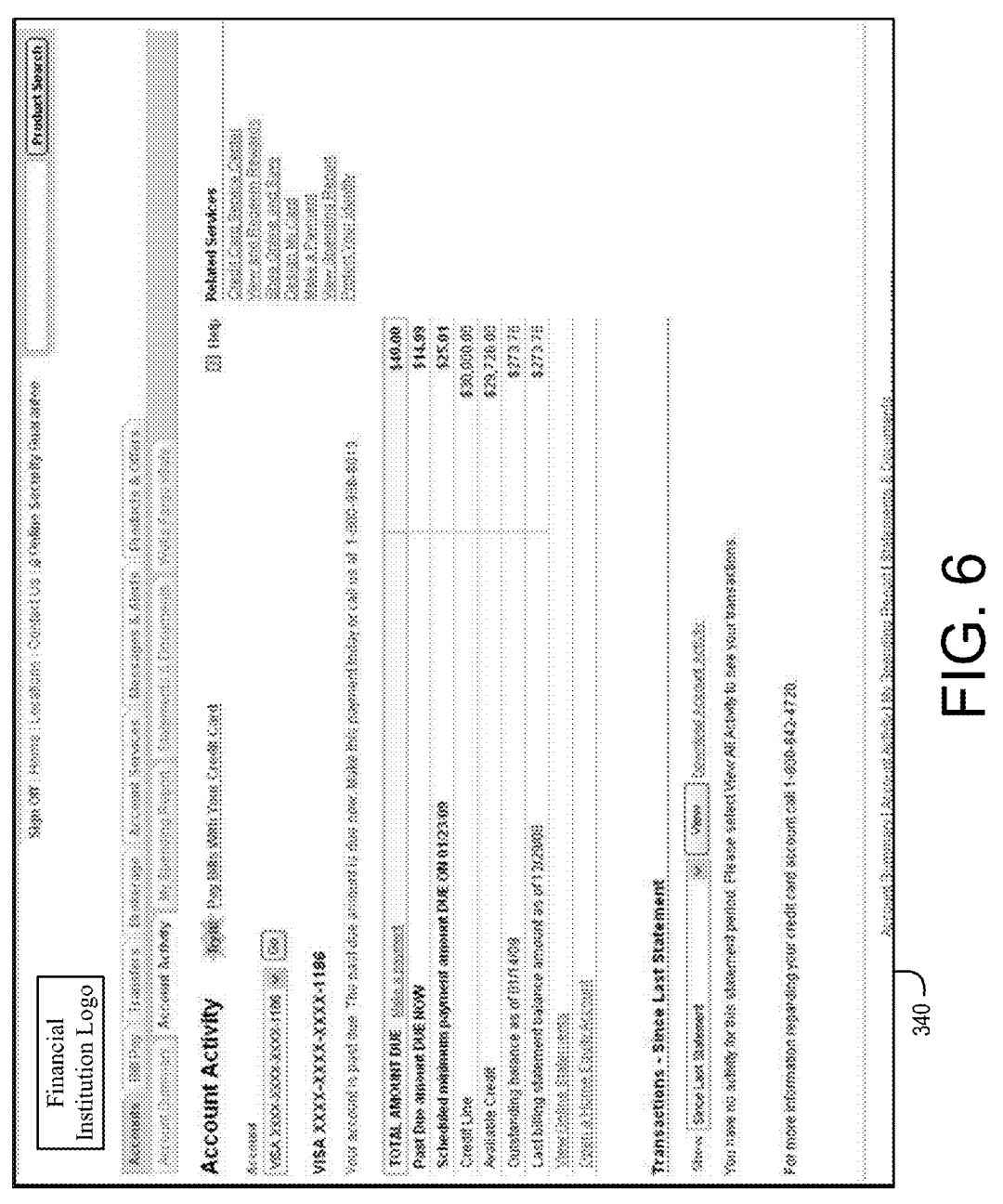

Referring to FIG. 7, FIG. 7 is an example display screen that may be shown if the account holder 152 selects link 450 in FIG. 4, link 530 in FIG. 5, or link 620 in FIG. 6. In particular, FIG. 7 allows the account holder 152 to choose between multiple options for making a payment, including opening a new account and transfer funds immediately (link 720), making an immediate on-time payment using transfers (link 730), making an immediate one-time payment from another bank (link 740), and viewing more payment program options (link 750). The payment program options may be generated by the payment option logic 145 based on real-time financial data. If the user selects link 730, the user is presented with payment options that include other banking institution accounts, other credit cards, pay pal accounts, travelers checks, Western Union or other forms for money transfers such as mobile payment via text messaging. If the user selects link 740, the user is delivered to a virtual collection agent, as described in greater detail in connection with FIGS. 8-12.

Figure 8:
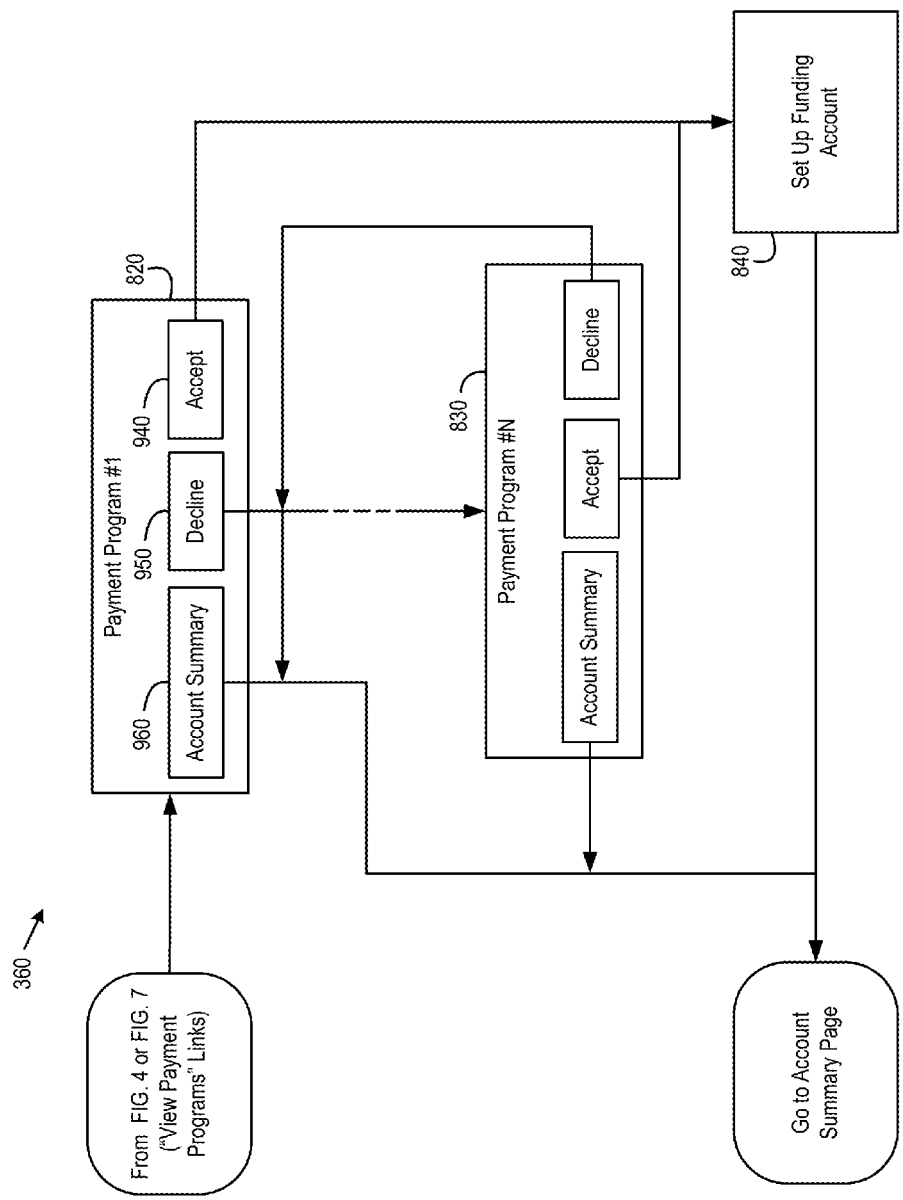
FIG. 8 is sequence of displays that may be provided to an account holder using the system shown in FIG. 1 to provide a virtual collection agent.

Referring now to FIG. 8, FIG. 8 is sequence of displays that may be provided to an account holder using the system shown in FIG. 1 to provide a virtual collection agent. As shown in FIG. 8, the payment option logic 145 customizes the page flow based on the risk assessment (e.g., the risk score) provided by the risk assessment logic 141 and other information regarding the account holder 152. Thus, as shown in FIG. 8, each account holder that reaches the virtual collection agent is provided with at least one payment program to remediate their adverse account status (screen 820). However, the type of the payment program that is provided at screen 820, and thus the type of display that is provided, is determined by the payment option logic 145. For example, the payment program may involve debt cancellation, such that the account holder ultimately pays an amount of principal which is less than that owed. As another example, the payment program may involve a restructuring of debt, e.g., such that the account holder ultimately pays off the entire principal but the term of payments is extended or the interest rate is temporarily reduced. Likewise, some account holders may be provided with only one payment program option (screen 820), whereas other account holders may be provided with one or more additional payment program options (screen(s) 830). The payment option logic 145 determines the number and type of payment program options that are provided, and thus the page flow that the account holder experiences.

Figure 9:
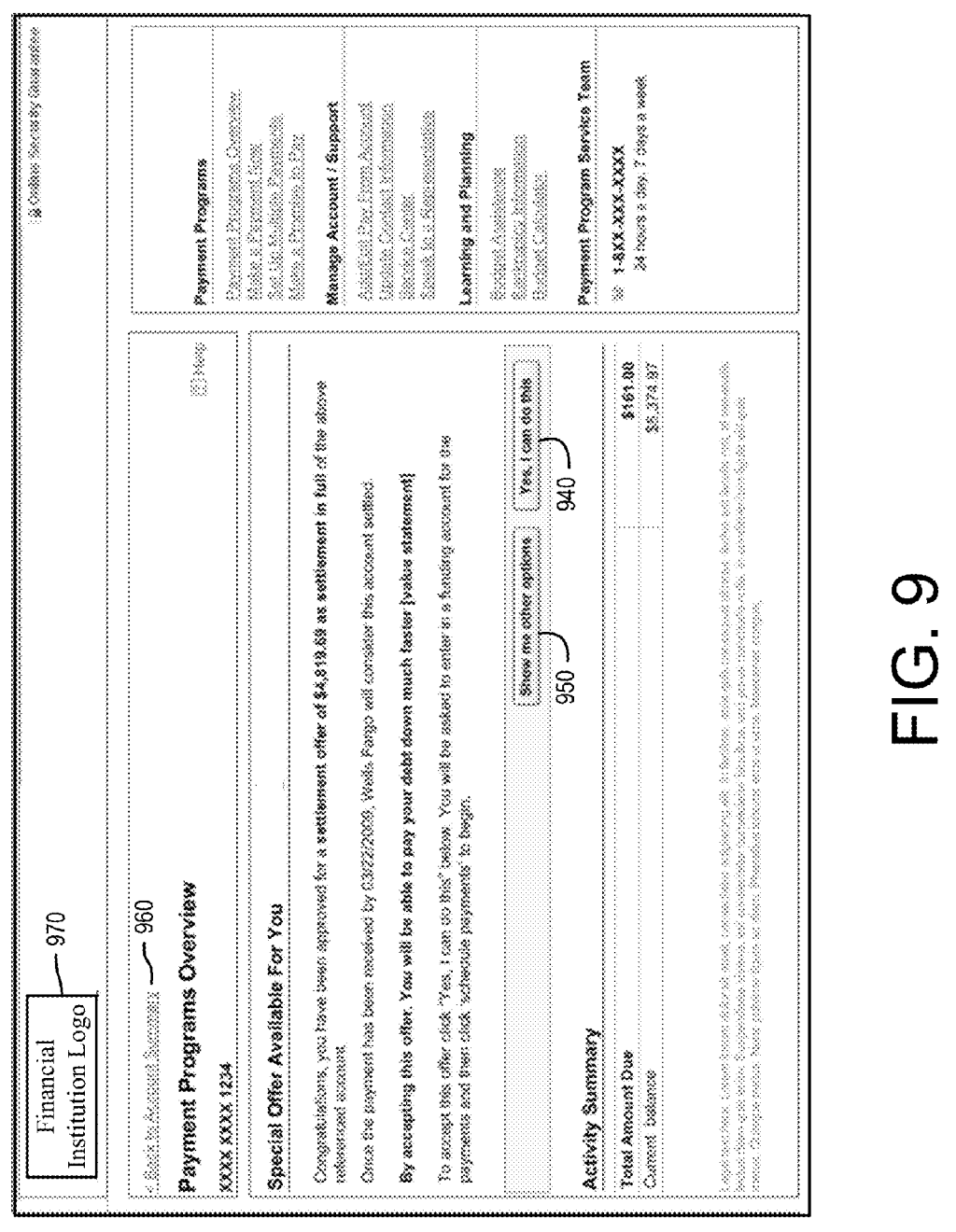
Figure 10:
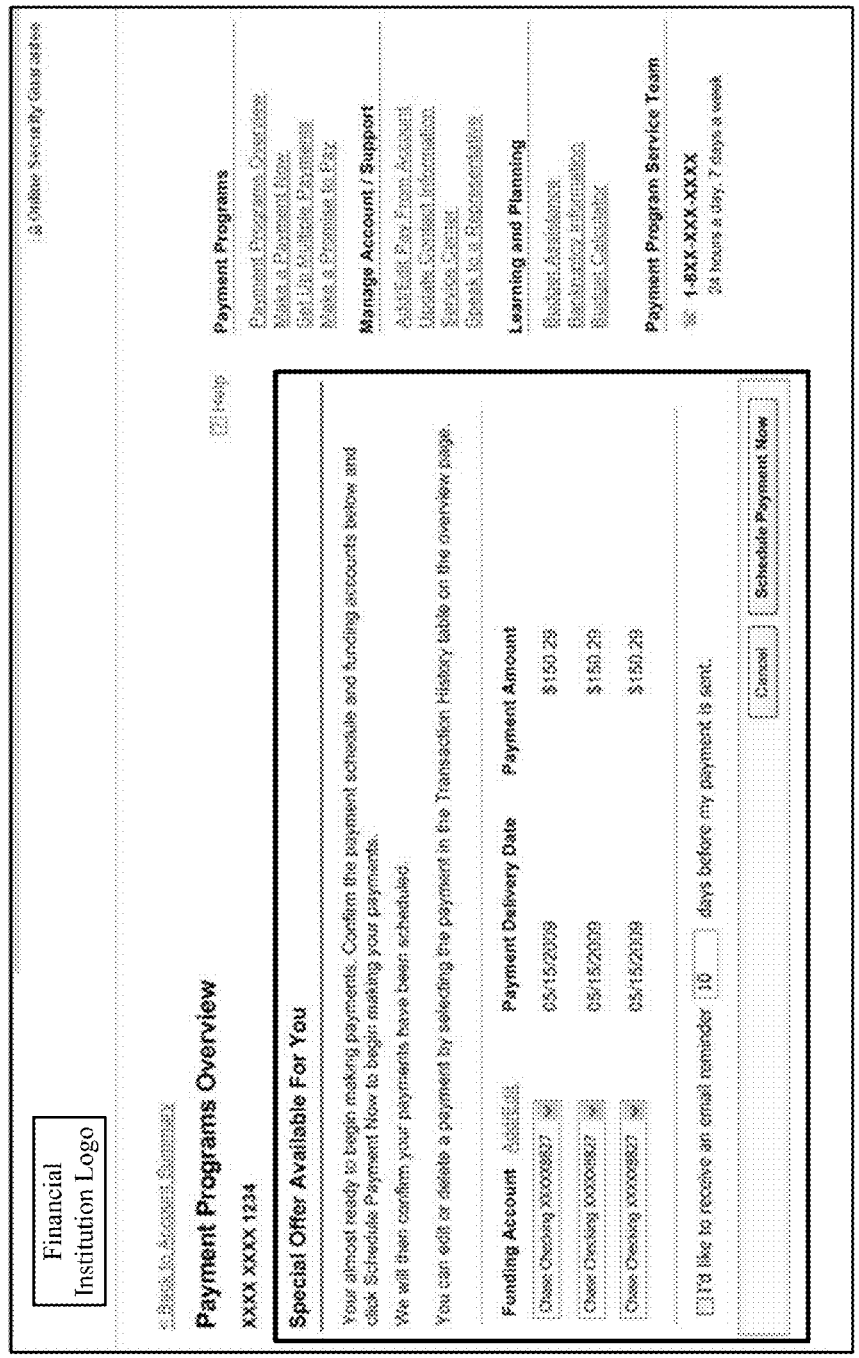
FIG. 10 is a screen display that may be provided to an account holder to provide details about a funding account to be used in connection with the payment program of FIG. 9.
Figure 11:
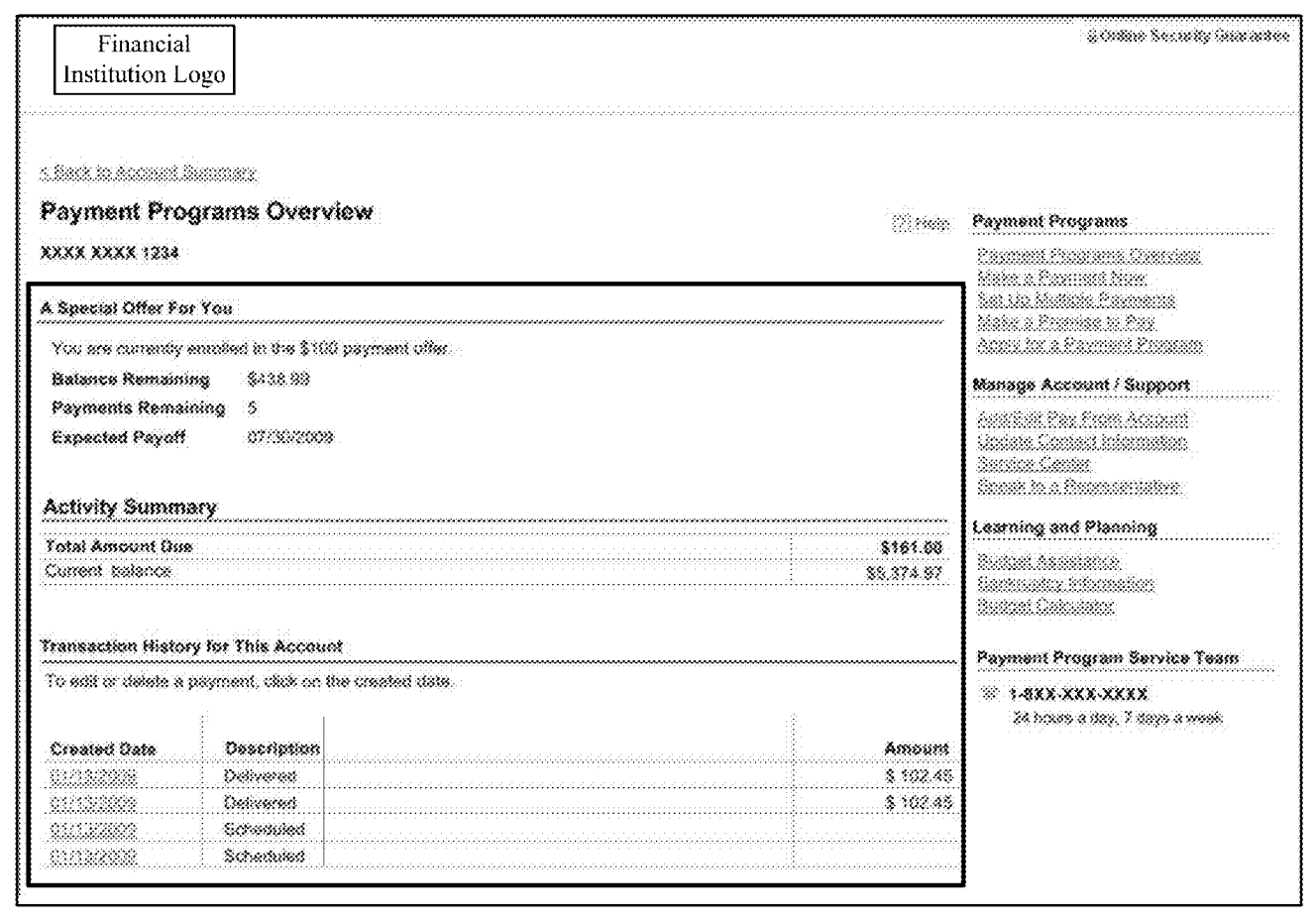

Referring now to FIG. 9, FIG. 9 is a screen display 820 showing a first payment program that may be offered to an account holder. In the example of FIG. 9, the account holder is provided with a settlement offer in which a portion of the debt owed by the account holder is canceled. If the account holder selects link 940, then the page sequence proceeds to screen 840, where the account holder is prompted to provided funding account information, as shown in FIGS. 10 and 11. If the account holder selects link 950, then the account holder may be provided with one or more additional payment program options, as previously described. If no more payment program options are provided, then the account holder may be returned to the account summary page 330 (e.g., potentially after further prompting to accept the payment program option provided via screen 820 or to take other remedial actions).

As shown in FIG. 9, the account holder is also provided with a link 960 to return directly to the account summary page 330, even in situations where the virtual collection agent logic 147 is associated with (e.g., outsourced to) a collection agent vendor rather than being part of the enterprise computing system 105 of the financial institution. Likewise, as will also be noted in FIG. 9, the screen display 820 continues to be branded with the logo 970 of the financial institution. As shown in FIGS. 10-11, the account holder may be provided with such links and branding throughout the pages 820-840 of the virtual collection agent. Thus, even in situations where the virtual collection agent logic 147 is associated with a collection agent vendor, the account holder is provided with a consistent, streamlined user experience.

Figure 12:
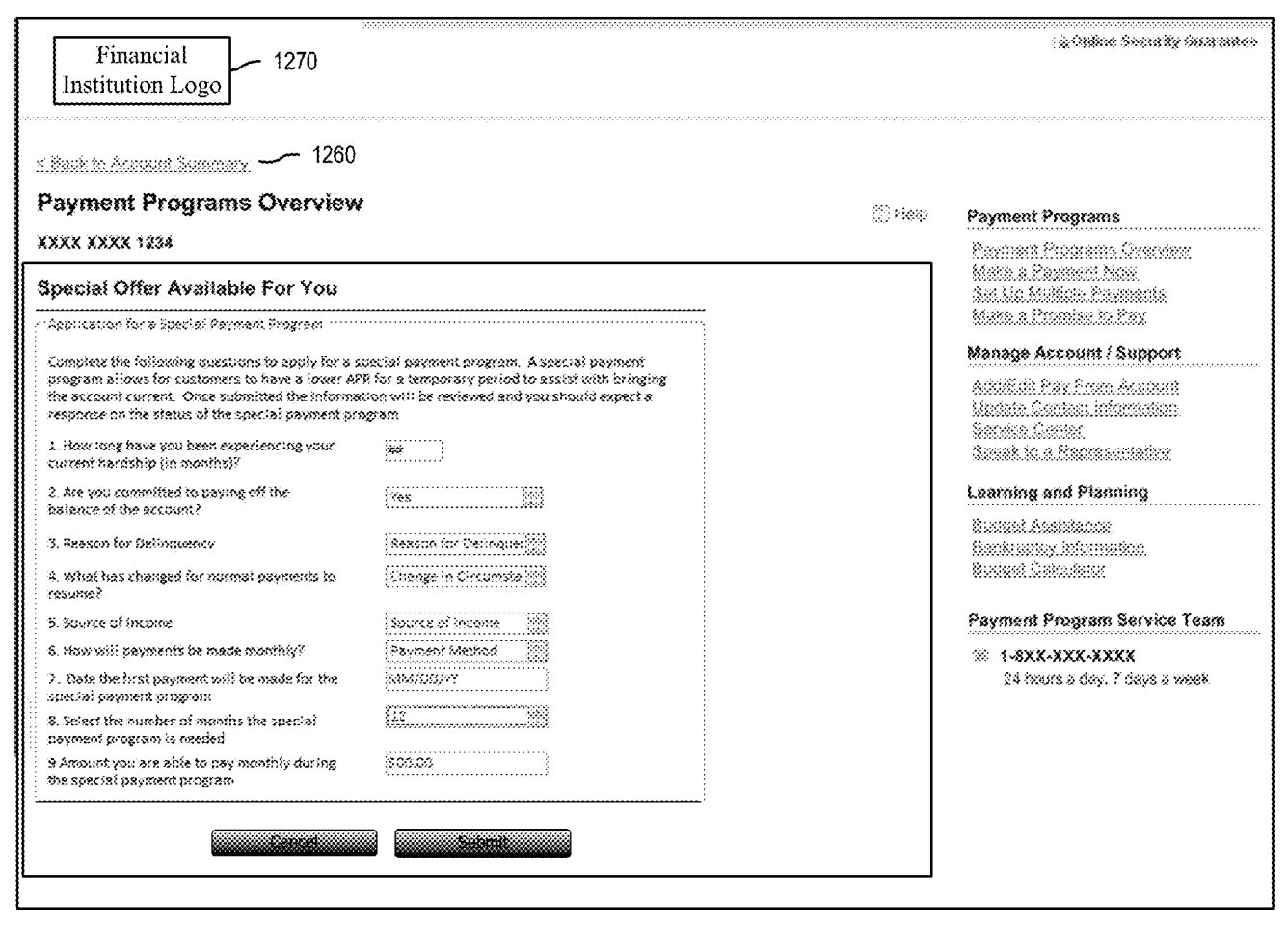

Referring now to FIG. 12, FIG. 12 is screen display that may be provided to an account holder in connection with a second payment program that may be offered to the account holder. In the example of FIG. 12, the account holder applies for a payment program in which the debt is restructured. Again, a link the screen display 830 includes a link 1260 to return directly to the account summary page 330 and continues to be branded with the logo 1270 of the financial institution.

Although an example page flow is described above, it will be appreciated that this page flow is merely one example. For example, although the page flow is described as being dynamically customized based on the risk assessment provided by the risk assessment logic 141, it will be appreciated that the page flow may also be dynamically customized based on other factors in addition to the risk assessment. For example, the page flow may be dynamically customized based on other customer profile information that is unrelated to the risk assessment. Likewise, the links that are provided on each page may also be dynamically customized based on such other customer profile information. Additionally, while certain pages are shown in the Figures, it will be appreciated that the Figures are not intended be comprehensive, and various other and/or different pages may also be presented to the account holder.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. A user computing device may be desktop computer, laptop computer, mobile computing device (e.g., handheld e-mail device, cellular phone, etc. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method for initiating account status remediation via an online banking website, comprising:
    receiving login information, using an account management system, from an account holder via an account login display presented to the account holder via a user computing device;
    responsive to receiving the login information, accessing a non-transitory machine-readable storage medium to access a database and retrieving information regarding an account of the account holder from the database;
    generating a risk assessment of the account holder that indicates a probability of delinquency or default on the account by the account holder based on an amount of the adverse account status and an amount of funds in other accounts of the account holder, using a risk assessment system;
    selecting a format of presenting an account remediation message to the account holder based on a level of risk determined by the risk assessment system, wherein the format varies according to the level of risk associated with the probability of delinquency or default;
    delivering, using a collection system, the account remediation message using the format selected, including generating an adverse account status display to prompt the account holder to remediate an adverse account status, the adverse account status display being presented to the account holder to view following the account login display via the user computing device, wherein the adverse account status display comprises the account remediation message generated based on the information retrieved from the database that informs the account holder of an adverse account status of the account; and
    in response to determining a relatively high degree of risk, generating and providing a splash page configured to display the account remediation message when the account holder logs onto the online banking website, wherein the splash page interrupts a flow of a normal login process to the online banking website.

2. A computer-implemented method for initiating account status remediation as part of an online banking website of a financial institution, comprising:
    receiving login information, using an account management system from an account holder;
    responsive to receiving the login information, accessing a non-transitory machine-readable storage medium to access a database and retrieving information regarding an account of the account holder from the database;
    generating a risk assessment that indicates a probability of delinquency or default on the account by the account holder, using a risk assessment system, based on the information retrieved from the database;
    selecting a format of presenting an account remediation message to the account holder based on the risk assessment system, wherein the format varies according to a level of risk;

delivering, using a collection system, the account remediation message using the format selected, including generating a display for presentation to the account holder via an account holder device to prompt the account holder to remediate an adverse account status, wherein the display comprises the account remediation message generated based on the information retrieved from the database that informs the account holder of an adverse account status of the account; and in response to determining a relatively high degree of risk, generating and providing a splash page configured to display the account remediation message when the account holder logs onto the online banking website, wherein the splash page interrupts a flow of a normal login process to the online banking website.

3. The method according to claim 2, wherein the format of the account remediation message is determined, and wherein selecting the format of presenting the account remediation message comprises determining that the account remediation message is to be provided on an account summary page.

4. The method according to claim 2, wherein the account holder is presented with options for remediation of the adverse account status by self-cure or is sent directly to a virtual collections agent, depending on the risk assessment.

5. The method according to claim 2 further comprising determining the content of the account remediation message, wherein determining the content of the message comprises customizing the content of the message based on the risk assessment system, the customized content comprising content other than a name of the user and other than account identification information for the account.

6. The method according to claim 1, wherein the account login display is a first display page, wherein a second display page is the display page presented to the user immediately following the first display page, and wherein the splash page is provided between the first display page and the second display page.

7. The method according to claim 6, wherein the second display page is an account summary page that includes account balance information for the account.

8. The method according to claim 2, wherein the risk assessment reflects a prediction of future payment patterns of the account holder based on past and most recent financial information regarding the account holder.

9. The method according to claim 2, wherein the risk assessment reflects changes in credit information, geographic residence and profession of the account holder.

10. The method according to claim 2, wherein the risk assessment reflects month to month account balance trends for the account holder.

11. The method according to claim 2, wherein the account remediation message is displayed regarding an highest risk account.

12. The method according to claim 2, wherein the risk assessment is based on economic data that (1) is not personal to the account holder and (2) reflects broader economic trends that impact the account holder more directly than the general population as a whole.

13. The method according to claim 2, further comprising:
generating a risk assessment based on the information retrieved from the database; and
determining a sequence of virtual collection agent pages based on the risk assessment.

14. The method according to claim 13, wherein branding of the virtual collection agent pages is consistent with branding of the on-line banking website of the financial institution.

15. A computer-implemented method for initiating account status remediation via an online banking website of a financial institution, comprising:
receiving bank account login information, using an account management system, from an account holder via an account login display presented to the account holder via a user computing device;
determining, using an account management system, a current status of the account held by the account holder;
generating a risk assessment of the account holder that indicates a probability of delinquency or default on the account by the account holder, using a risk assessment system, based on the information retrieved from the database;
selecting a format of displaying an account remediation message to the account holder based on the risk assessment, wherein the format varies according to a level of risk associated with the probability of delinquency or default;
displaying, using a collection system, the account remediation message following the account login display according to the format selected to inform the account holder of the adverse account status and provide remedial options to the account holder to prompt the account holder to remediate the adverse account status; and
in response to determining a relatively high degree of risk, generating and providing a splash page configured to display the account remediation message when the account holder logs onto the online banking website, wherein the splash page interrupts a flow of a normal login process to the online banking website.

16. The method according to claim 15, further comprising determining a risk based score for the account holder based on most recently available financial profile of the account holder.

17. The method according to claim 16, further comprising providing self-cure options based on the adverse account status and the risk based score.

18. The method according to claim 16, further comprising varying the severity of the account remediation message based on the financial profile of the account holder.

19. A computer-implemented method for initiating online collections via an online banking website of a financial institution, comprising:
determining a current status of an account held by an account holder at a banking institution, using an account management system;
determining a real time risk assessment, using a risk assessment system, for the account using information in a computer system of the banking institution and based on information received from third party information providers, the real time risk assessment indicating an adverse account status in connection with the account;
generating an account remediation message to be displayed on an account holder device customized based on the risk assessment;
generating a risk assessment of the account holder that indicates a probability of delinquency or default on the account by the account holder, using a risk assessment system, based on the information retrieved from the database;

selecting a format of presenting the account remediation message to the account holder based on the risk assessment system, wherein the format varies according to the level of risk associated with the probability of delinquency or default;

delivering, using a collection system, the account remediation message using the format selected, including generating, using the collection system, an adverse account status display to prompt the account holder to remediate the adverse account status, the adverse account status display being presented to the account holder following the account login display, wherein the adverse account status display comprises the account remediation message generated based on the information retrieved from the third party information provider; and in response to determining a relatively high degree of risk, generating and providing a splash page configured to display the account remediation message when the account holder logs onto the online banking website, wherein the splash page interrupts a flow of a normal login process to the online banking website.

20. The method according to claim 19, wherein the content of the message is customized for each account holder such that different messages are seen by different account holders, the customized content comprising content other than a name of the account holder and other than account identification information for the account.

21. The method according to claim 20, wherein the collection system is configured to vary the intensity of the message.

22. The method according to claim 20, wherein the most recent account information is used in the account remediation message.

23. The method according to claim 20, further comprising maintaining a dynamically updated self-cure table that comprises information from public sources, credit bureau information, behavioral characteristics of the customer over the past 12 months, past account balances, cash flows, and account balance trends.

24. The method of claim 1, wherein the format is part of a webpage after login when there is a lower level of risk.

25. The method of claim 1, wherein the content of the account remediation message provide a greater number of options for high risk account holders than a number options for lower risk account holders.

26. The method of claim 2, wherein the format of the account remediation message increases when there is a higher level of risk.

27. The method of claim 2, wherein the adverse account status comprises at least one of a payment delinquency on a credit card account or other loan, and being over the credit limit on the credit card account.

28. The method of claim 2, wherein the adverse account status comprises at least one of an overdrawn checking account, and excessive number of transactions on the account.

* * * * *